UNITED STATES PATENT OFFICE.

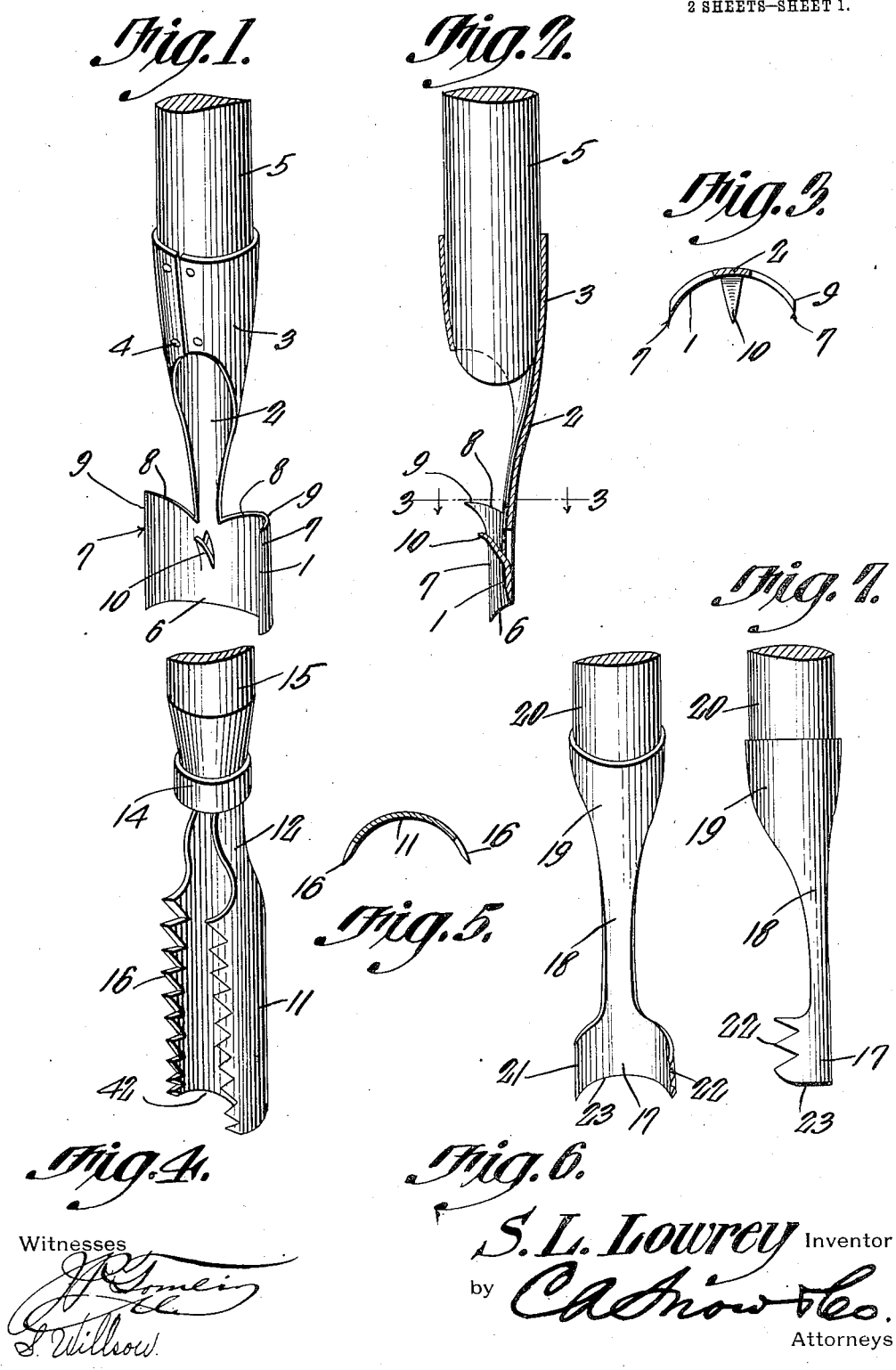

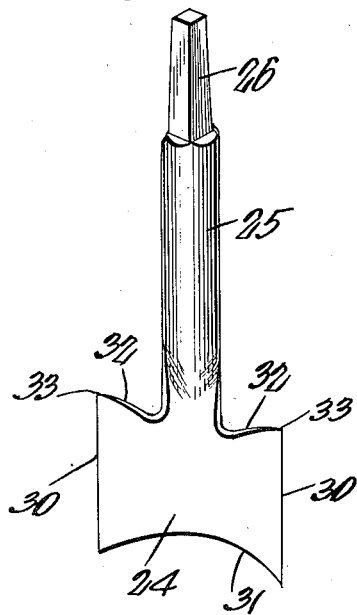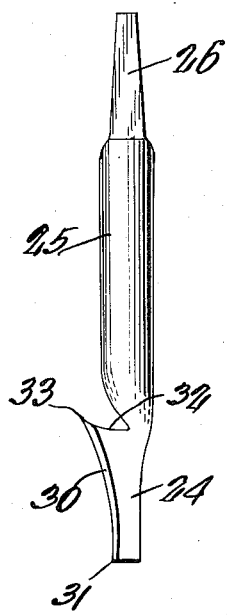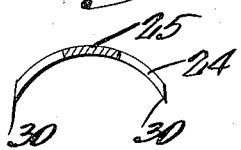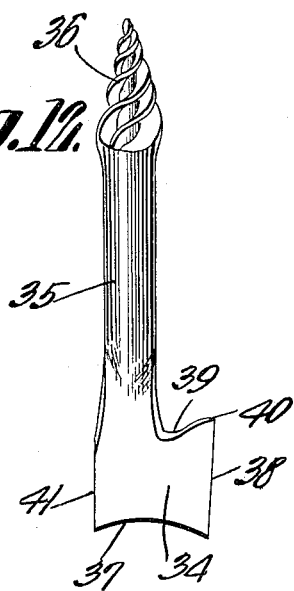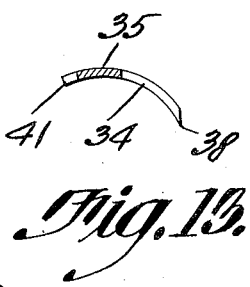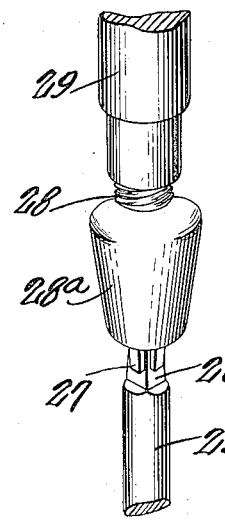

SHERMAN L. LOWREY, OF PITTSBURGH, PENNSYLVANIA.

WEED-EXTRACTING TOOL.

1,065,456.　　　　　Specification of Letters Patent.　　Patented June 24, 1913.

Application filed November 4, 1912. Serial No. 729,530.

*To all whom it may concern:*

Be it known that I, SHERMAN L. LOWREY, a citizen of the United States, residing at Pittsburgh, in the county of Allegheny and State of Pennsylvania, have invented a new and useful Weed-Extracting Tool, of which the following is a specification.

The device herein disclosed, is adapted to be employed for cutting roots of dandelions, plantains and other noxious weed, and for lifting the same from the soil.

The invention aims to provide a tool of the class described having novel means for cutting the roots of the weeds and for lifting the weeds.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing, Figure 1 shows one form of the invention in front elevation; Fig. 2 is a longitudinal section of the structure shown in Fig. 1; Fig. 3 is a transverse section on the line 3—3 of Fig. 2; Fig. 4 is a perspective showing a modified form of the invention; Fig. 5 is a transverse section of the structure shown in Fig. 4; Fig. 6 is a front elevation showing a modified form of the invention; Fig. 7 is side elevation depicting the structure shown in Fig. 6; Fig. 8 is a front elevation showing a modified form of the invention; Fig. 9 is a side elevation of the structure shown in Fig. 8; Fig. 10 is a transverse section of the modification shown in Figs. 8 and 9; Fig. 11 is a perspective showing the means whereby the blade shown in Figs. 8 and 9 may be assembled with a handle; Fig. 12 is a front elevation showing a modified form of the invention; and Fig. 13 is a transverse section of the structure shown in Fig. 12.

In carrying out the invention, and referring particularly to that form of the invention which appears in Figs. 1, 2 and 3, there is shown a transversely curved blade 1, merging into a shank 2 provided with a split socket 3 attached by means of securing elements 4 to a handle 5. The blade 1 is provided with a lower, upwardly concaved cutting edge 6. The lateral cutting edges of the blade 1 are shown at 7. The upper edges 8 of the blade 1 slant downwardly toward the shank 2 to define lifting prongs 9 which project forwardly and overhang the side cutting edges 7. Struck from the body portion of the blade 1 and preferably but not necessarily alined vertically with the shank 2 is a forwardly projecting, inclined, pointed lifting prong 10.

In practical operation, the blade 1 is thrust downwardly into the ground, whereupon the edge 6 will cut those lateral roots which lie in its path. The blade 1 may be rotated, causing the edges 7 to cut the lateral roots. When the blade is lifted through the medium of the handle 5, the prongs 9 and 10 will lift the weed out of the ground, along with more or less of the earth which immediately surrounds the weed.

In that form of the invention which appears in Figs. 4 and 5, a transversely curved blade 11 is shown, the same merging into a shank 12, terminated in a ring 14, adapted to receive a handle 15. The blade 11 is serrated along its upright, forward edges, to define a plurality of lifting prongs 16. The blade 11 at its lower end is provided with a cutting edge 42.

In that form of the invention which is shown in Figs. 6, and 7, a cutting blade 17 is provided, the same merging into a shank 18 terminated in a socket 19 receiving a handle 20. At one side, and along one of its vertical edges, the blade 17 is formed with an upright cutting edge 21. The other lateral edge of the blade 17 is formed with a plurality of prongs 22. The lower cutting edge of the blade 7 is indicated at 23. By rotating the blade 17 through the medium of the handle 20, the edge 21 may be employed for cutting the lateral roots, the prongs 22 constituting means for lifting the weed out of the ground.

In that form of the invention which appears in Figs. 8, 9 and 10 there is shown a transversely curved blade 24 provided with a shank 25, terminated in a tang 26 adapted to be received between fingers 27, formed at the lower end of a screw 28 connected with a handle 29. A tapered nut 28ª may be threaded upon the screw 28 to effect a compression of the fingers 27 about the tang 26. The blade 24 is provided at its sides with upright cutting edges 30, the lower cutting edge of the blade being indicated at 31. The upper edges of the blade 24 slant as shown at 32 toward the shank 25, to define prongs 33.

The device shown in Figs. 8, 9 and 10 is adapted peculiarly to be employed when it is desired merely to cut the roots of the weeds, the weeds being permitted to remain in the ground, to wither away. However, by manipulating the handle 29, the prongs 33 which overhang the edges 30, may be engaged in the weeds to lift the same, although, primarily, the device depicted in Figs. 8, 9 and 10 is adapted to be employed for cutting weeds only, without lifting them from the soil, the construction of the device is such that this result may be accomplished readily.

In the form of the invention which appears in Figs. 12 and 13, there is shown a transversely curved blade 34 merging into a shank 35, provided with a screw 36 which may be threaded into the handle. The blade 34 is provided with an upright cutting edge 38. One upper edge of the blade 37 slants downwardly as shown at 39 toward the shank 35 to define a prong 40. The other upright edge 41 of the blade 34 is located close to the side face of the shank 35.

The structure shown in Figs. 12 and 13 is adapted to be employed for cutting the roots of small weeds, in lawns, and elsewhere, where it is desired to leave no holes in the ground. However, should the operator desire, the prong 40 may be employed for lifting the weed.

As will be understood readily, any of the several forms of handle attaching means may be connected with any one of the blades. It is within the scope of the invention to supply the blades either singly or in a set, and when the blades are provided in a set, embracing two or more of the blades shown, the blades, preferably, are provided with the handle structure shown in Fig. 11.

It will be understood that with all of the tools herein disclosed, a relatively long handle is employed, so that the several tools may be used when the operator is standing, it being unnecessary for the operator to kneel or to assume a cramped posture or any other sort.

Having thus described the invention what is claimed is:—

A tool of the class described comprising a transversely curved blade and a shank projected from the top of the blade, the shank being located close to one side edge of the blade, said side edge merging unbrokenly into the cutter surface of the shank, the other side edge of the blade being spaced from the shank to dispose the major portion of the blade to one side of the axis of the shank, the upper edge of the blade, at one side only of the shank, slanting downwardly from the upper end of the last specified side edge, toward the shank to define a single lifting prong.

In testimony that I claim the foregoing as my own, I have hereto affixed my signature in the presence of two witnesses.

SHERMAN L. LOWREY.

Witnesses:
R. V. McGough,
Mrs. S. L. Lowrey.